(12) United States Patent
Cho (10) Patent No.: US 9,396,427 B2
(45) Date of Patent: Jul. 19, 2016

(54) REMOVABLE TRAY INTEGRATED SMART CARD AND MOBILE TERMINAL ADOPTING THE SAME

(71) Applicant: SK C&C CO., LTD., Seongnam-si, Gyeonggi-do (KR)

(72) Inventor: Zang Hee Cho, Suwon-si (KR)

(73) Assignee: SK HOLDINGS CO., LTD., Seoul (KR)

( * ) Notice: Subject to any disclaimer, the term of this patent is extended or adjusted under 35 U.S.C. 154(b) by 0 days.

(21) Appl. No.: 14/367,006

(22) PCT Filed: Dec. 18, 2012

(86) PCT No.: PCT/KR2012/011076
§ 371 (c)(1),
(2) Date: Jun. 19, 2014

(87) PCT Pub. No.: WO2013/094966
PCT Pub. Date: Jun. 27, 2013

(65) Prior Publication Data
US 2014/0374491 A1    Dec. 25, 2014

(30) Foreign Application Priority Data

Dec. 19, 2011    (KR) .......................... 10-2011-0137082

(51) Int. Cl.
*G06K 19/06*       (2006.01)
*G06K 19/077*      (2006.01)
(Continued)

(52) U.S. Cl.
CPC .......... *G06K 19/077* (2013.01); *G06K 13/0831* (2013.01); *G06K 19/07732* (2013.01);
(Continued)

(58) Field of Classification Search
CPC .......... G06K 19/0723; G06K 19/0727; G06K 19/07749; G06K 19/077; G06K 13/0831; G06K 19/07732; G06Q 20/341
USPC .................................................... 235/487, 492
See application file for complete search history.

(56) References Cited

U.S. PATENT DOCUMENTS 5,887,145 A *   3/1999   Harari et al. ................... 710/301
6,893,268 B1 *  5/2005   Harari et al. ................... 439/43
(Continued)

FOREIGN PATENT DOCUMENTS

CN    1732448 A    2/2006
CN    1749921 A    3/2006
(Continued)

OTHER PUBLICATIONS

International Search Report for PCT/KR2012/011076 dated Apr. 3, 2013.
(Continued)

*Primary Examiner* — Paultep Savusdiphol
(74) *Attorney, Agent, or Firm* — Sughrue Mion, PLLC (57) ABSTRACT

A removable tray integrated smart card and a mobile terminal adopting the same are provided. The smart card includes: a case configured to be removable into/from a smart card insertion slot of a mobile terminal; and a secure element provided in the case, wherein the case is removable into/from the smart card insertion slot without being placed on a tray. Accordingly, the smart card such as a USIM-card can be inserted into the mobile terminal without using the tray. In addition, since the size of the smart card increases as the smart card is unified with the tray, many high performance antennas and wireless modules can be inserted into the smart card and thus wireless communication performance of the smart card can be enhanced.

21 Claims, 5 Drawing Sheets

(51) Int. Cl.
*H04B 1/3816* (2015.01)
*G06K 13/08* (2006.01)
*H04M 1/02* (2006.01)

(52) U.S. Cl.
CPC ........ *G06K19/07749* (2013.01); *H04B 1/3816* (2013.01); *G06K 19/07739* (2013.01); *H04M 1/0202* (2013.01); *H04M 1/0274* (2013.01); *H04M 2250/04* (2013.01)

(56) References Cited

U.S. PATENT DOCUMENTS

| | | | |
|---|---|---|---|
| 7,291,903 B2* | 11/2007 | Nishizawa et al. | 257/679 |
| 7,427,032 B2* | 9/2008 | Osako et al. | 235/492 |
| 8,777,669 B2* | 7/2014 | Hu | H01R 12/714 439/159 |
| 2001/0006902 A1* | 7/2001 | Ito | 455/558 |
| 2003/0069040 A1* | 4/2003 | Chuang et al. | 455/558 |
| 2003/0133270 A1* | 7/2003 | Liu et al. | 361/728 |
| 2004/0089717 A1* | 5/2004 | Harari et al. | 235/441 |
| 2006/0054698 A1* | 3/2006 | Lev et al. | 235/441 |
| 2007/0145135 A1* | 6/2007 | Jogand-Coulomb et al. | 235/451 |
| 2007/0145152 A1* | 6/2007 | Jogand-Coulomb et al. | 235/492 |
| 2008/0099559 A1 | 5/2008 | Lo et al. | |
| 2010/0033307 A1* | 2/2010 | Narendra et al. | 340/10.1 |
| 2011/0149533 A1 | 6/2011 | Luo et al. | |
| 2011/0171996 A1* | 7/2011 | Narendra et al. | 455/558 |
| 2012/0276765 A1* | 11/2012 | Nakase | G06K 13/0831 439/159 |
| 2012/0309213 A1* | 12/2012 | Lai | G06K 13/08 439/159 |
| 2013/0045615 A1* | 2/2013 | Su | G06K 13/0831 439/159 |
| 2013/0201646 A1* | 8/2013 | Braun | H05K 5/0282 361/784 |

FOREIGN PATENT DOCUMENTS

| | | |
|---|---|---|
| CN | 201163784 Y | 12/2008 |
| EP | 1 815 407 A1 | 6/2006 |
| JP | 2004-348235 A | 12/2004 |
| WO | 2010/052770 A1 | 5/2010 |
| WO | 2011/029943 A1 | 3/2011 |

OTHER PUBLICATIONS

Australian Examination Report for corresponding Application No. 2012354498 issued May 28, 2015.
European Search Report for corresponding Application No. 12859053.6 issued Jun. 26, 2015.
Chinese Office Action for corresponding Application No. 201280062602.9 issued Mar. 1, 2016.

* cited by examiner

REMOVABLE TRAY INTEGRATED SMART CARD AND MOBILE TERMINAL ADOPTING THE SAME

CROSS REFERENCE TO RELATED APPLICATIONS

This application is a National Stage of International Application No. PCT/KR2012/011076, filed on Dec. 18, 2012, which claims priority from Korean Patent Application No. 10-2011-0137082, filed on Dec. 19, 2011, the contents of all of which are incorporated herein by reference in their entirety.

TECHNICAL FIELD

The present invention relates to a smart card and a mobile terminal adopting the same, and more particularly, to a smart card which is removable into/from a smart card insertion slot of a mobile terminal, and a mobile terminal adopting the same.

BACKGROUND ART

Figure 1:
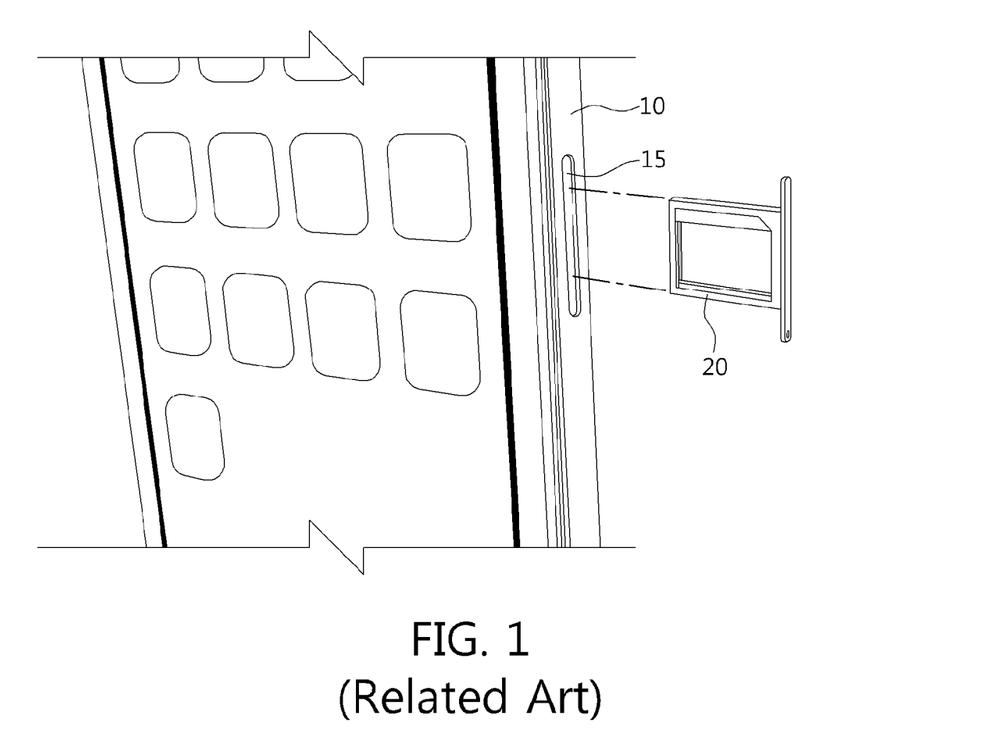
FIG. 1 is a view illustrating a mechanism for inserting/removing a USIM-card into/from a mobile terminal.

FIG. 1 is a view illustrating a mechanism for inserting/removing a Universal Subscriber Identity Module (USIM)-card into/from a mobile terminal. As shown in FIG. 1, a tray 20 is required to insert a USIM-card into a USIM-card insertion slot 15 of a mobile terminal 10.

That is, the USIM-card is inserted into the USIM-card insertion slot 15 with being placed on the tray 20. Since the tray 20 should have the USIM-card placed thereon, the size of the tray 20 is larger than the USIM-card.

As described, the tray 20 is required to insert the USIM-card into the mobile terminal 10. Therefore, there is inconvenience of having to manufacture, sell/provide, and use the tray 20.

As the USIM-card is used for various purposes such as mobile payment, there is a need for wireless communication between the USIM-card and an external device. However, the size of the USIM-card is not enough to be equipped with an antenna, or even if the USIM-card is equipped with an antenna, the antenna does not show high performance due to its limited size.

DISCLOSURE

Technical Problem

One or more exemplary embodiments provide a smart card which is configured to be insertable into a smart card insertion slot of the mobile terminal and can be inserted into the smart card insertion slot without being placed on the tray for the purpose of inserting the smart card into a mobile terminal without using a tray and enhancing wireless communication performance of the smart card, and a mobile terminal adopting the same.

Technical Solution

According to an aspect of an exemplary embodiment, there is provided a smart card including: a case configured to be removable into/from a smart card insertion slot of a mobile terminal; and a secure element provided in the case, wherein the case is removable into/from the smart card insertion slot without being placed on a tray.

An exterior standard of the case may be identical to an exterior standard of the tray.

The case may include: a body configured to be inserted into the smart card insertion slot of the mobile terminal and a cover configured to cover the smart card insertion slot.

The body and the cover may be unified with each other.

The smart card may further include an antenna configured for communication between the secure element and an external device, and wherein the antenna may be provided on a side surface of the secure element.

The smart card may further include an antenna configured for communication between the secure element and an external device, and the antenna may be provided outside the secure element.

An area in which the secure element and the antenna are arranged may be larger than an area of a smart card which is insertable into the smart card insertion slot with being placed on the tray.

The smart card may further include a booster positioned between the secure element and the antenna to amplify a signal.

The smart card may further include a communication module configured to perform communication between the secure element and the external device via the antenna.

According to an aspect of an exemplary embodiment, there is provided a mobile terminal provided with a smart card insertion slot into which a smart card is insertable, the smart card including: a case configured to be insertable into the smart card insertion slot; and a secure element provided in the case, wherein the case is insertable into the smart card insertion slot without being placed on a tray.

Advantageous Effects

As described above, according to an exemplary embodiment, the smart card is shaped to be insertable into the smart card insertion slot of the mobile terminal and thus is insertable into the smart card insertion slot without being placed on the tray. Accordingly, the smart card such as a USIM-card can be inserted into the mobile terminal without using the tray.

In addition, since the size of the smart card increases as the smart card is unified with the tray, many high performance antennas and wireless modules can be inserted into the smart card and thus wireless communication performance of the smart card can be enhanced.

BEST MODE

Reference will now be made in detail to the embodiment of the present general inventive concept, examples of which are illustrated in the accompanying drawings, wherein like reference numerals refer to the like elements throughout. The embodiment is described below in order to explain the present general inventive concept by referring to the drawings.

Figure 2:
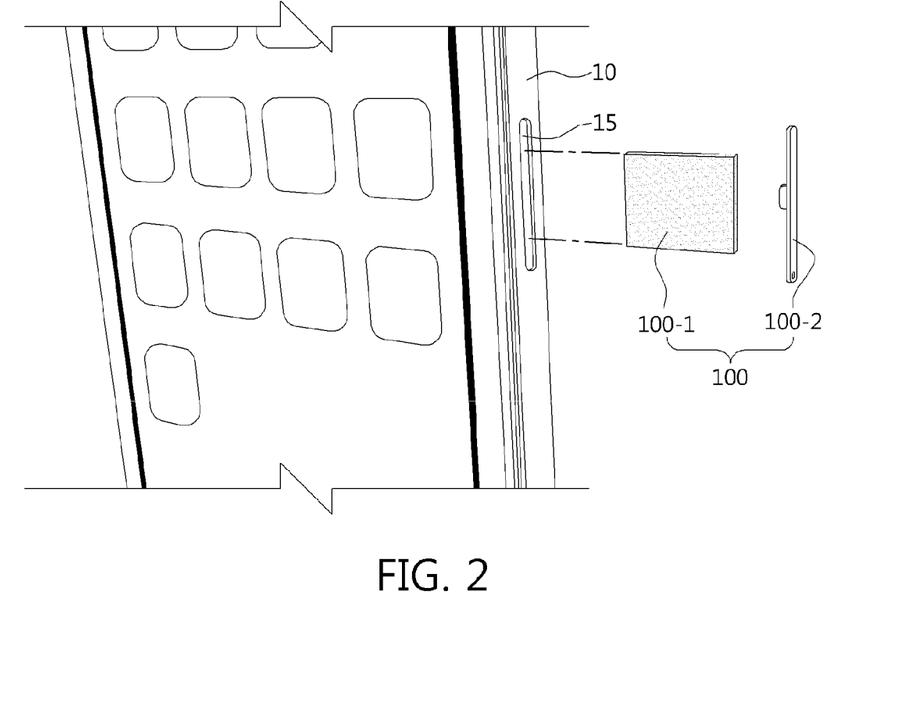
FIG. 2 is a view illustrating an exterior of a USIM-card according to an exemplary embodiment of the present invention.

FIG. 2 is a view illustrating an exterior of a USIM-card according to an exemplary embodiment of the present invention. The exterior of the USIM-card 100 includes a case-body 100-1 and a cover 100-2 as shown in FIG. 2

The case-body 100-1 is shaped to be inserted/removed, sliding into/from a USIM-card insertion slot 15 of a mobile terminal 10, and is different from a related art USIM-card in that the USIM-card can be inserted/removed into/from the USIM-card insertion slot 15 without being placed on a tray.

The cover 100-2 is a means for covering the USIM-card insertion slot 15 into which the case-body 100-1 is inserted, and may be the same as a side surface of the mobile terminal 10 in material and color (or may be the same as the tray 20 in material and color). The cover 100-2 may be manufactured/sold along with the USIM-card 100 and also may be manufactured/sold along with the mobile terminal 10.

The exterior standard of the USIM-card 100 including the case-body 100-1 and the cover 100-2 is the same as that of the related art USIM-card tray 20 shown in FIG. 1. Accordingly, the USIM-card 100 can be removed/inserted, sliding into/from the USIM-card insertion slot 15 without being placed on a tray.

A USIM, which is one exemplary type of secure element, is provided in the case-body 100-1, and a communication module may further be provided according to one exemplary type of USIM-card. Hereinafter, an interior configuration of the case-body 100-1 will be explained in detail.

Figure 3:
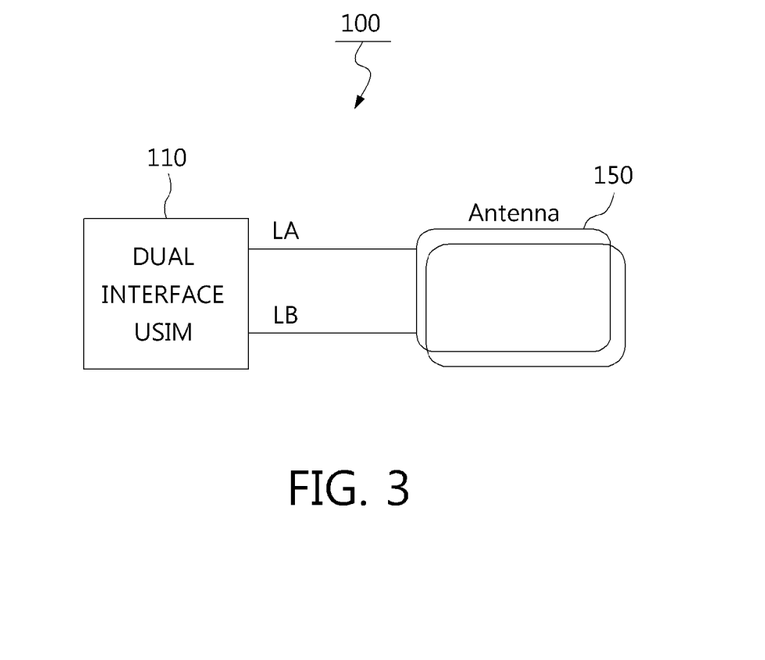
FIG. 3 is an interior block diagram of a first type of USIM-card.

FIG. 3 is an interior block diagram of a first type of USIM-card 100. The USIM-card 100 shown in FIG. 3 is a USIM-card which provides a service by communicating with an external device via an antenna 150 based on an applet installed in a dual interface USIM 110 and credential stored in the dual interface USIM 110.

In general, the external device recited herein may be a USIM-card reader, but does not exclude other kinds of communication devices.

Figure 4:
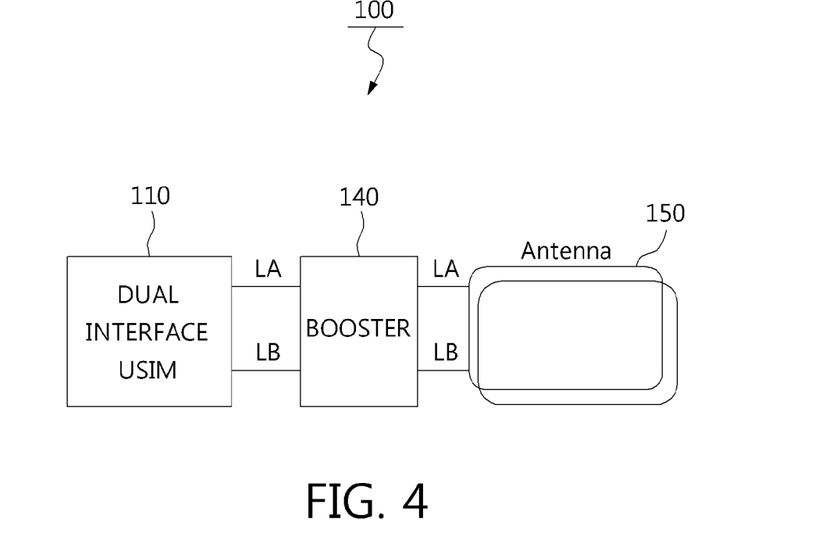
FIG. 4 is an interior block diagram of a second type of USIM-card.

FIG. 4 is an interior block diagram of a second type of USIM-card 100. The USIM-card 100 shown in FIG. 4, in common with the USIM-card 100 shown in FIG. 3, provides a service by communicating with an external device via an antenna 150 based on an applet installed in a dual interface USIM 110 and credential stored in the dual interface USIM 110.

However, the USIM-card 100 of FIG. 4 is different from the USIM-card 100 of FIG. 3 in that a booster 140 is provided between the dual interface USIM 110 and the antenna 150 to amplify a signal to enhance communication performance.

Figure 5:
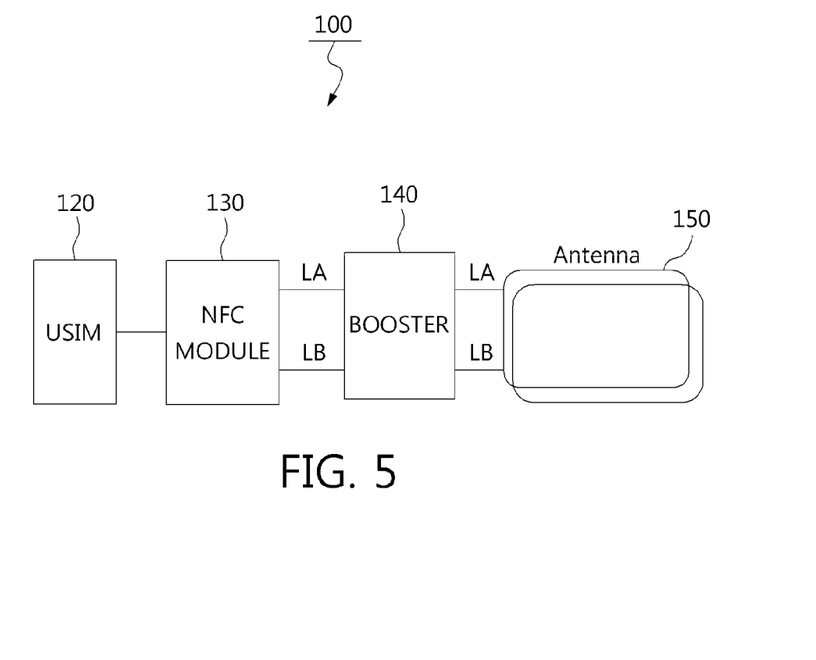
FIG. 5 is an interior bock diagram of a third type of USIM-card.

FIG. 5 is an interior block diagram of a third type of USIM-card 100. The USIM card 100 shown in FIG. 5, in common with the USIM-card 100 shown in FIGS. 3 and 4, provides a service by communicating with an external device via an antenna 150 based on an applet installed in a USIM 120 and credential stored in the USIM 102.

However, the USIM-card 100 shown in FIG. 5 is different from the USIM-card 100 shown in FIGS. 3 and 4 in that a Near Field Communication (NFC) module 130 performs communication in the USIM-card 100 of FIG. 5, but the dual interface USIM 110 directly performs communication in the USIM-card 100 of FIGS. 3 and 4.

A booster 140 provided in the USIM-card 100 shown in FIG. 5 is to enhance communication performance and is not an essential element, and thus may be omitted when necessary.

In the USIM-card 100 shown in FIGS. 3 to 5, the antenna 150 is positioned on a side surface area of the other modules.

That is, the antenna 150 1) is positioned on a side surface area of the dual interface USIM 110 of the USIM-card 100 shown in FIG. 3, 2) is positioned on a side surface area of the dual interface USIM 110 and the booster 140 of the USIM-card 100 shown in FIG. 4, or 3) is positioned on a side surface area of the USIM 120, the NFC module 130, and the booster 140 of the USIM-card 100 shown in FIG. 5.

Figure 6:
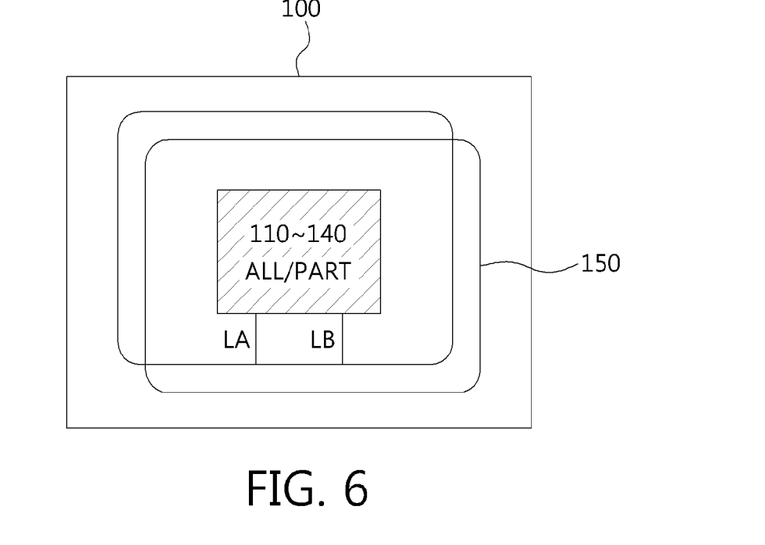
FIG. 6 is a view illustrating a USIM-card which is implemented in a different way from arrangements of the USIM-card and the antenna of FIGS. 3 to 5.

However, this is merely an example for convenience of understanding and explanation and the antenna 150 may be positioned in different ways. FIG. 6 illustrates a USIM-card 100 which is implemented in a different way from arrangements of the USIM-card 100 and the antenna of FIGS. 3 to 5.

Referring to FIG. 6, the antenna 150 is positioned inside a border of the USIM-card 100. That is, the antenna 150 is positioned outside the module blocks 110 to 140 (all or a part) provided in the USIM-card 100, indicated with hatched pattern.

The module blocks 110 to 140 (all or a part), indicated with hatched pattern, may be implemented in various ways when necessary. For example, the module blocks indicated with hatched pattern may be implemented 1) by using the dual interface USIM 110 as shown in FIG. 3, 2) by using the dual interface USIM 110 and the booster 140 as shown in FIG. 4, 3) by using the USIM 120, the NFC module 130, and the booster 140 as shown in FIG. 5, or 4) by using a combination of other elements.

The exterior standard of the USIM-card 100 according to the exemplary embodiment including the case-body 100-1 and the cover 100-2 is the same as that of the related art USIM card tray 20 shown in FIG. 1.

Accordingly, an area in which at least one module (at least one of the modules 110 to 140) and the antenna 150 are arranged in the USIM-card 100 (that is, an area occupied by at least one module (at least one of the modules 110 to 140) and the antenna) can be larger than the area of the related art USIM-card.

That is, since the area of the USIM-card 100 according to the exemplary embodiment corresponds to the area of the related art USIM-card tray 20 on which the related art USIM-card is placed, the area of the USIM-card 100 is larger than that of the related art USIM-card.

Accordingly, the antenna 150 provided in the USIM-card 100 according to the exemplary embodiment can be larger than that of the related art USIM-card, so that communication performance can be enhanced. In addition, the other modules provided in the USIM-card 100 according to the exemplary embodiment can be larger than those of the related art USIM card and the number of modules to be embedded in the USIM-card 100 can be larger than that of the related art USIM card.

Figure 7:
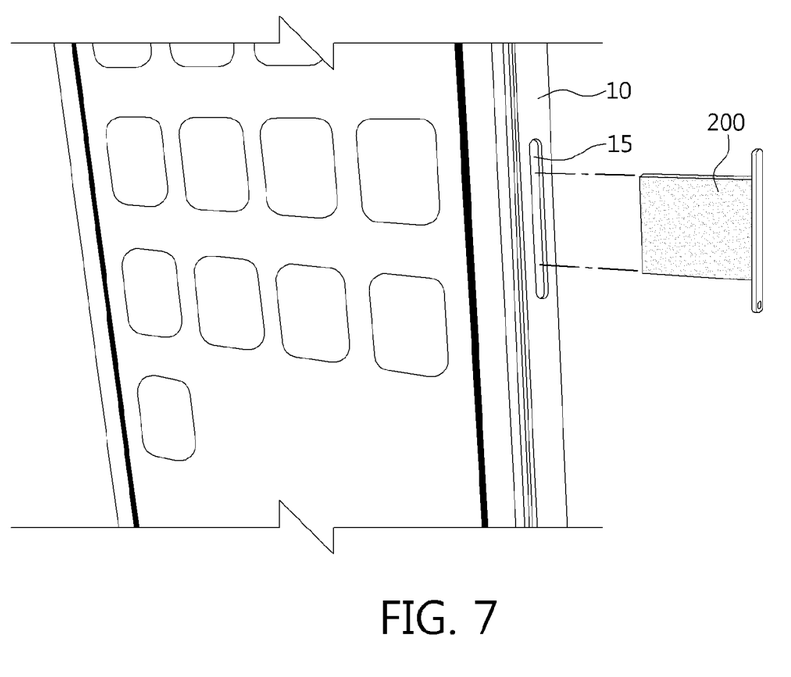
FIG. 7 is a view illustrating an exterior of a USIM-card according to another exemplary embodiment of the present invention.

FIG. 7 is a view illustrating an exterior of a USIM-card according to another exemplary embodiment of the present invention. The exterior of the USIM-card 200 shown in FIG. 7 is different from the exterior of the USIM-card 100 shown in FIG. 2 in that the case-body and the cover are unified with each other in the USIM-card 200 of FIG. 7, but the case-body 110-1 and the cover 100-2 are separated from each other in the USIM-card 100 of FIG. 2.

Up to now, the exemplary embodiments of the USIM-card which is removable into/from the mobile terminal 10 without using a tray have been described.

The USIM-card mentioned in the above-described exemplary embodiments is merely an example for convenience of understanding and explanation, and the technical idea of the present invention can be applied to a smart card other than the USIM-card.

In addition, the mobile terminal is not limited to the kinds of mobile terminals mentioned in the above-described exemplary embodiments. The technical idea of the present invention can be applied to other kinds of mobile terminals in addition to a smartphone and a tablet PC.

In addition, a mobile terminal from which a smart card is removable as well as a smart card can belong to the scope of the technical idea of the present invention.

The foregoing exemplary embodiments and advantages are merely exemplary and are not to be construed as limiting the present inventive concept. The exemplary embodiments can be readily applied to other types of apparatuses. Also, the description of the exemplary embodiments is intended to be illustrative, and not to limit the scope of the claims, and many alternatives, modifications, and variations will be apparent to those skilled in the art.

The invention claimed is:

1. A smart card insertable into a smart card insertion slot of a mobile terminal, wherein an existing smart card mounted in a tray having a larger size than a size of the existing card is insertable into the smart card insertion slot of the mobile terminal, the smart card comprising:
   a case configured to be insertable into and removable from the smart card insertion slot of the mobile terminal; and
   a secure element provided in the case,
   wherein an exterior standard of the case of the smart card is identical to an exterior standard of the tray on which the existing smart card is mounted to be inserted into the smart card insertion slot, and the case is insertable into and removable from the smart card insertion slot without being placed on the tray.

2. The smart card of claim 1, wherein the case comprises:
   a body configured to be inserted into the smart card insertion slot of the mobile terminal and
   a cover configured to cover the smart card insertion slot.

3. The smart card of claim 2, wherein the body and the cover are unified with each other.

4. The smart card of claim 1, further comprising an antenna configured for communication between the secure element and an external device,
   wherein the antenna is provided on a side surface of the secure element.

5. The smart card of claim 4, wherein an area in which the secure element and the antenna are arranged is larger than an area of a smart card which is insertable into the smart card insertion slot with being placed on the tray.

6. The smart card of claim 4, further comprising a booster positioned between the secure element and the antenna to amplify a signal.

7. The smart card of claim 4, further comprising a communication module configured to perform communication between the secure element and the external device via the antenna.

8. The smart card of claim 1, further comprising an antenna configured for communication between the secure element and an external device,
   wherein the antenna is provided outside the secure element.

9. The smart card of claim 8, wherein an area in which the secure element and the antenna are arranged is larger than an area of a smart card which is insertable into the smart card insertion slot with being placed on the tray.

10. The smart card of claim 8, further comprising a booster positioned between the secure element and the antenna to amplify a signal.

11. The smart card of claim 8, further comprising a communication module configured to perform communication between the secure element and the external device via the antenna.

12. The smart card of claim 1, further comprising
   an antenna configured for communication between the secure element and an external device;
   a booster positioned between the secure element and the antenna to amplify a signal; and
   a communication module configured to perform communication between the secure element and the external device via the antenna,
   wherein an area in which the antenna is arranged is larger than an area in which the secure element, the booster and the communication module are arranged, and the antenna is provided outside the secure element, the booster and the communication module and inside a border of the smart card.

13. A mobile terminal provided with a smart card insertion slot into which a smart card is insertable, wherein an existing smart card mounted on a tray having a larger size than a size of the existing smart card is insertable into the smart card insertion slot, the smart card comprising:
   a case configured to be insertable into the smart card insertion slot; and
   a secure element provided in the case,
   wherein an exterior standard of the case of the smart card is identical to an exterior standard of the tray on which the existing smart card is mounted to be inserted into the smart card insertion slot, and the case is insertable into the smart card insertion slot without being placed on the tray.

14. The mobile terminal of claim 13, wherein the case comprises:
   a body configured to be inserted into the smart card insertion slot of the mobile terminal and
   a cover configured to cover the smart card insertion slot.

15. The mobile terminal of claim 14, wherein the body and the cover are unified with each other.

16. The mobile terminal of claim 13, further comprising an antenna configured for communication between the secure element and an external device,
   wherein the antenna is provided on a side surface of the secure element.

17. The mobile terminal of claim 16, wherein an area in which the secure element and the antenna are arranged is larger than an area of a smart card which is insertable into the smart card insertion slot with being placed on the tray.

18. The mobile terminal of claim 16, further comprising a booster positioned between the secure element and the antenna to amplify a signal.

19. The mobile terminal of claim 16, further comprising a communication module configured to perform communication between the secure element and the external device via the antenna.

20. The mobile terminal of claim 13, further comprising an antenna configured for communication between the secure element and an external device,
   wherein the antenna is provided outside the secure element.

21. The mobile terminal of claim 13, wherein the smart card further comprises:
   an antenna configured for communication between the secure element and an external device;
   a booster positioned between the secure element and the antenna to amplify a signal; and a communication module configured to perform communication between the secure element and the external device via the antenna, wherein an area in which the antenna is arranged is larger than an area in which the secure element, the booster and the communication module are arranged and the antenna is provided outside the secure element, the booster and the communication module and inside a border of the smart card.

* * * * *